US011038707B2

United States Patent
Ardai et al.

(10) Patent No.: US 11,038,707 B2
(45) Date of Patent: Jun. 15, 2021

(54) REMOTE CONFIGURATION OF LIGHTING POWER SUPPLY

(71) Applicants: Michael Ardai, Malden, MA (US); Lin Yang, Lynnfield, MA (US); Suraj Gajendar, Dover, NH (US); Sivakumar Thangavelu, Billerica, MA (US)

(72) Inventors: Michael Ardai, Malden, MA (US); Lin Yang, Lynnfield, MA (US); Suraj Gajendar, Dover, NH (US); Sivakumar Thangavelu, Billerica, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 239 days.

(21) Appl. No.: 15/803,870

(22) Filed: Nov. 6, 2017

(65) Prior Publication Data

US 2018/0062872 A1 Mar. 1, 2018

Related U.S. Application Data

(62) Division of application No. 13/473,588, filed on May 16, 2012, now Pat. No. 9,819,508.

(60) Provisional application No. 61/486,764, filed on May 16, 2011.

(51) Int. Cl.
*H04L 12/28* (2006.01)

(52) U.S. Cl.
CPC .............................. *H04L 12/2816* (2013.01)

(58) Field of Classification Search
CPC .................................................. H04L 12/2816
USPC ......................................................... 315/291
See application file for complete search history.

(56) References Cited

U.S. PATENT DOCUMENTS

| | | | | |
|---|---|---|---|---|
| 5,343,529 A | * | 8/1994 | Goldfine | ................. G06F 21/31 340/5.5 |
| 2008/0157939 A1 | * | 7/2008 | Sutardja | ............. H05B 37/0254 340/12.33 |
| 2015/0002024 A1 | * | 1/2015 | Shah | .................... G06Q 30/018 315/149 |

* cited by examiner

*Primary Examiner* — Metasebia T Retebo
(74) *Attorney, Agent, or Firm* — Shaun P. Montana

(57) ABSTRACT

Systems, methods, and computer program products for remote configuration of one or more power supplies, particularly lighting power supplies, are disclosed. A configuration signal that includes a setting for a parameter is generated and then transmitted to a power supply. The power supply decodes the configuration signal and, if one or more certain conditions are met, configures the power supply according to information provided in the configuration signal.

12 Claims, 4 Drawing Sheets

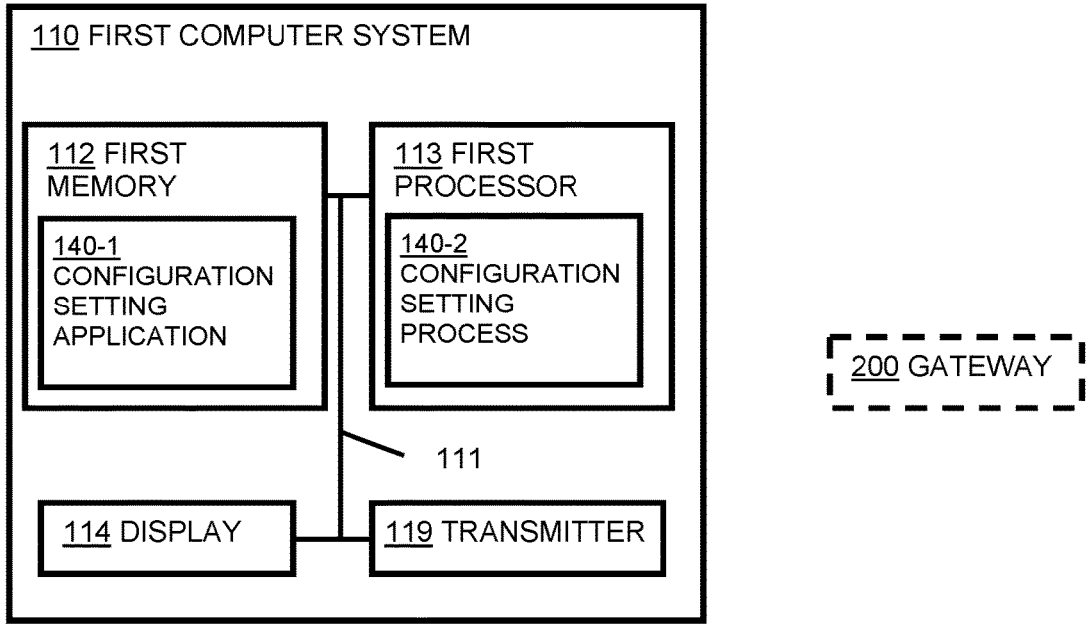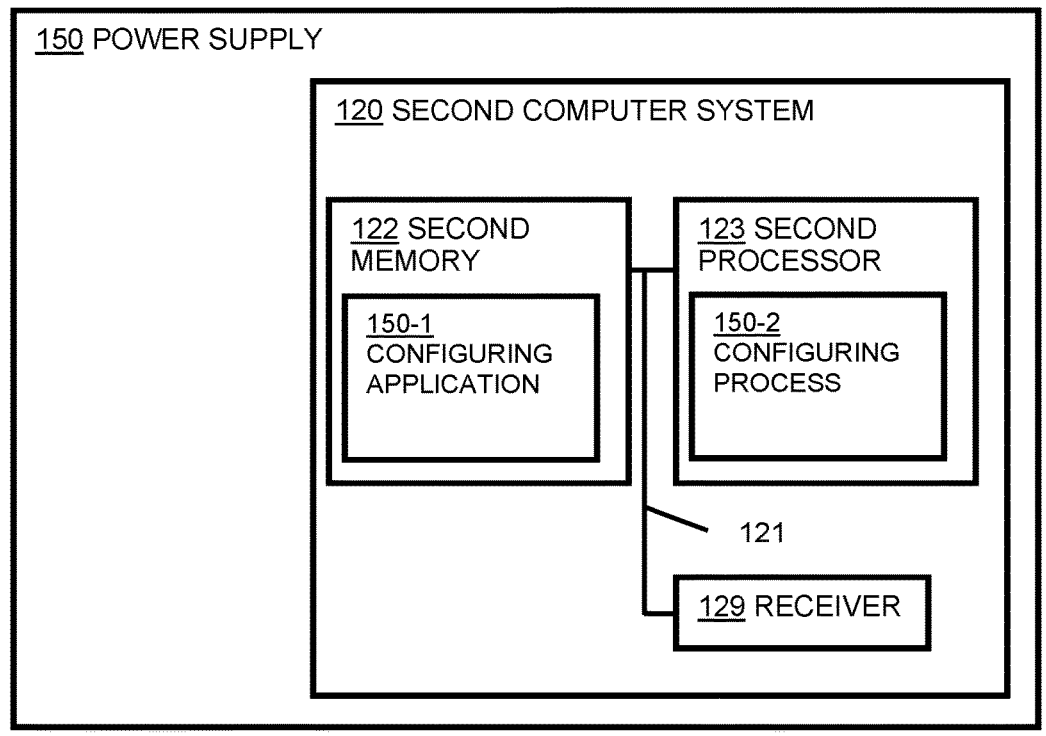
FIG. 1

201 ENABLE A RECEIVER CONNECTED TO A POWER SUPPLY, WHEREIN THE RECEIVER IS CONNECTED TO A MEMORY SYSTEM, WHEREIN THE MEMORY SYSTEM INCLUDES AT LEAST ONE PARAMETER VALUE FOR A PARAMETER ASSOCIATED WITH THE POWER SUPPLY

202 RECEIVE A CONFIGURATION SIGNAL VIA THE ENABLED RECEIVER, WHEREIN THE CONFIGURATION SIGNAL INCLUDES A PARAMETER SETTING FOR A PARAMETER ASSOCIATED WITH THE POWER SUPPLY

203 DECODE THE CONFIGURATION SIGNAL WITHIN THE POWER SUPPLY

204 CONFIGURE THE POWER SUPPLY BASED ON THE DECODED CONFIGURATION SIGNAL AND THE PARAMETER SETTING WHEN THE PARAMETER SETTING MATCHES THE AT LEAST ONE PARAMETER VALUE

FIG. 2

401 ENABLE A TRANSMITTER, WHEREIN THE TRANSMITTER HAS A CORRESPONDING RECEIVER

402 SEND, VIA THE ENABLED TRANSMITTER, AN ENABLE SIGNAL TO THE CORRESPONDING RECEIVER, WHEREIN THE CORRESPONDING RECEIVER IS CONNECTED TO THE POWER SUPPLY

403 IN RESPONSE, ENABLE THE RECEIVER, WHEREIN THE RECEIVER IS CONNECTED TO A MEMORY SYSTEM, WHEREIN THE MEMORY SYSTEM INCLUDES AT LEAST ONE PARAMETER VALUE FOR A PARAMETER ASSOCIATED WITH THE POWER SUPPLY

404 PROVIDE A USER INTERFACE ON A DISPLAY OF A COMPUTER SYSTEM TO A USER, WHEREIN THE COMPUTER SYSTEM IS CONNECTED TO THE TRANSMITTER

405 RECEIVE, VIA THE USER INTERFACE, A PARAMETER SETTING FOR A PARAMETER ASSOCIATED WITH THE POWER SUPPLY

406 TRANSMIT, VIA THE ENABLED TRANSMITTER, A CONFIGURATION SIGNAL INCLUDING THE PARAMETER SETTING FOR THE PARAMETER ASSOCIATED WITH THE POWER SUPPLY TO THE ENABLED RECEIVER OF THE POWER SUPPLY

407 RECEIVE THE CONFIGURATION SIGNAL VIA THE ENABLED RECEIVER

408 DECODE THE CONFIGURATION SIGNAL WITHIN THE POWER SUPPLY

409 CONFIGURE THE POWER SUPPLY BASED ON THE DECODED CONFIGURATION SIGNAL AND THE PARAMETER SETTING WHEN THE PARAMETER SETTING MATCHES THE AT LEAST ONE PARAMETER VALUE

FIG. 4

REMOTE CONFIGURATION OF LIGHTING POWER SUPPLY

CROSS-REFERENCE TO RELATED APPLICATIONS

The present application is a divisional of, and claims priority of, U.S. patent application Ser. No. 13/473,588, filed May 16, 2012, now U.S. Pat. No. 9,819,508, which claims priority of U.S. Provisional Application No. 61/486,764, filed May 16, 2011 and entitled "OVER-THE-AIR CONFIGURATION OF LIGHTING POWER SUPPLIES", the entire contents of both of which are hereby incorporated by reference.

TECHNICAL FIELD

The present invention relates to lighting, and more specifically, to power supplies for light sources.

BACKGROUND

Modern solid state light source-based luminaires and fixtures may have numerous parameters that are used to configure them both at the manufacturer and when used in the field by end users. Technical parameters could includes a maximum device current, a maximum intensity (i.e., level of lumens output), and pulse width modulation rate. End user parameters could include dimming rates, minimum and maximum intensities (i.e., levels of lumens output) for controlled dimming, and power-up intensity (i.e., starting level of lumens output). Typically, the parameters are either hardcoded in embedded firmware within the device, or are hardwired into the circuitry of the device. Some parameters typically need to be set during the manufacture of the device, and others may typically be changed from time to time according to the end user's evolving use and want.

SUMMARY

Conventional techniques for storing and changing parameters for solid state light source-based luminaires and fixtures, such as those described above, suffer from a number of deficiencies. The primary deficiency is that whether parameters are hardcoded in embedded firmware or hardwired into circuitry, it is thus hard to change the parameters. When hardcoded into embedded firmware, the firmware of the device needs to be changed and re-programmed in order to change the parameters. When hardwired into circuitry, the power supply needs to have at least some of its circuit components changed, or the power supply must be exchanged for an entirely new power supply having the desired parameter(s).

Embodiments of the present invention provide systems and methods to remotely configure a lighting power supply. Embodiments thus allow for parameters of a lighting power supply to be configured on the fly, according to a user's want, reducing the time needed for setup and allowing customization by an installer, distributer, and/or end user. Embodiments reduce the expense and complexity of stocking multiple versions of a given power supply for different light sources and/or lighting applications, particularly when the only difference is in one or a small number of components.

In an embodiment, there is provided a method. The method includes: enabling a receiver connected to a power supply, wherein the receiver is connected to a memory system, wherein the memory system includes at least one parameter value for a parameter associated with the power supply; receiving a configuration signal via the enabled receiver, wherein the configuration signal includes a parameter setting for a parameter associated with the power supply; decoding the configuration signal within the power supply; and configuring the power supply based on the decoded configuration signal and the parameter setting when the parameter setting matches the at least one parameter value.

In another embodiment, there is provided a method. The method includes: enabling a transmitter, wherein the transmitter has a corresponding receiver; sending, via the enabled transmitter, an enable signal to the corresponding receiver, wherein the corresponding receiver is connected to a power supply; providing a user interface on a display of a computer system to a user; receiving, via the user interface, a parameter setting for at least one parameter associated with the power supply; and transmitting, via the enabled transmitter, a configuration signal including the parameter setting for the at least one parameter associated with the power supply to the enabled receiver of the power supply so as to configure the power supply according to the transmitted configuration signal when the parameter setting is within a permitted range of values for the parameter of the power supply.

In another embodiment, there is provided a computer program product, stored on a non-transitory computer readable medium, including instructions that, when executed on a processor in communication with a power supply, cause the processor to perform operations of: enabling a receiver connected to the power supply, wherein the receiver is connected to a memory system, wherein the memory system includes at least one parameter value for a parameter associated with the power supply; receiving a configuration signal via the enabled receiver, wherein the configuration signal includes a parameter setting for a parameter associated with the power supply; decoding the configuration signal within the power supply; and configuring the power supply based on the decoded configuration signal and the parameter setting when the parameter setting matches the at least one parameter value.

In another embodiment, there is provided a computer program product, stored on a non-transitory computer readable medium, including instructions that, when executed on a processor of a computer system in communication with a power supply, cause the processor to perform operations of: enabling a transmitter, wherein the transmitter has a corresponding receiver; sending, via the enabled transmitter, an enable signal to the corresponding receiver, wherein the corresponding receiver is connected to the power supply; providing a user interface on a display of the computer system to a user; receiving, via the user interface, a parameter setting for at least one parameter associated with the power supply; and transmitting, via the enabled transmitter, a configuration signal including the parameter setting for the at least one parameter associated with the power supply to the enabled receiver of the power supply so as to configure the power supply according to the transmitted configuration signal when the parameter setting is within a permitted range of values for the parameter of the power supply.

In another embodiment, there is provided a method of remotely configuring a power supply. The method includes: enabling a transmitter, wherein the transmitter has a corresponding receiver; sending, via the enabled transmitter, an enable signal to the corresponding receiver, wherein the corresponding receiver is connected to the power supply; in response, enabling the receiver, wherein the receiver is connected to a memory system, wherein the memory system includes at least one parameter value for a parameter associated with the power supply; providing a user interface on a display of a computer system to a user, wherein the computer system is connected to the transmitter; receiving, via the user interface, a parameter setting for a parameter associated with the power supply; transmitting, via the enabled transmitter, a configuration signal including the parameter setting for the parameter associated with the power supply to the enabled receiver of the power supply; receiving the configuration signal via the enabled receiver; decoding the configuration signal within the power supply; and configuring the power supply based on the decoded configuration signal and the parameter setting when the parameter setting matches the at least one parameter value.

In another embodiment, there is provided a system to remotely configure a power supply. The system includes: a first computer system, wherein the first computer system comprises: a first processor; a first memory; a display; a transmitter in communication with the power supply; and a first interconnection mechanism allowing communication between the first processor, the first memory, the display, and the transmitter; wherein the first memory includes a configuration setting application; and a second computer system in connection with the power supply, wherein the second computer system comprises: a second processor; a second memory; a receiver associated with the transmitter; and a second interconnection mechanism allowing communication between the second processor, the second memory, and the receiver; wherein the second memory includes a configuring application and at least one parameter value for a parameter associated with the power supply; wherein the configuration setting application, when executed in the first processor as a configuration setting process, and wherein the configuring application, when executed in the second processor as a configuring process, causes the first computer system and the second computer system to perform operations of: enabling the transmitter; sending, via the enabled transmitter, an enable signal to the associated receiver; in response, enabling the associated receiver; providing a user interface on the display of the first computer system to a user; receiving, via the user interface, a parameter setting for a parameter associated with the power supply; transmitting, via the enabled transmitter, a configuration signal including the parameter setting for the parameter associated with the power supply to the enabled associated receiver; receiving the configuration signal via the enabled associated receiver; decoding the configuration signal within the second computer system; and configuring the power supply based on the decoded configuration signal and the parameter setting when the parameter setting matches the at least one parameter value.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 1 shows a system to remotely configure a power supply according to embodiments disclosed herein.

FIGS. 2-4 illustrate flowcharts of various procedures performed by the system of FIG. 1 when sending configurations to a power supply and configuring the power supply according to the send configuration(s).

DETAILED DESCRIPTION

Figure 3:
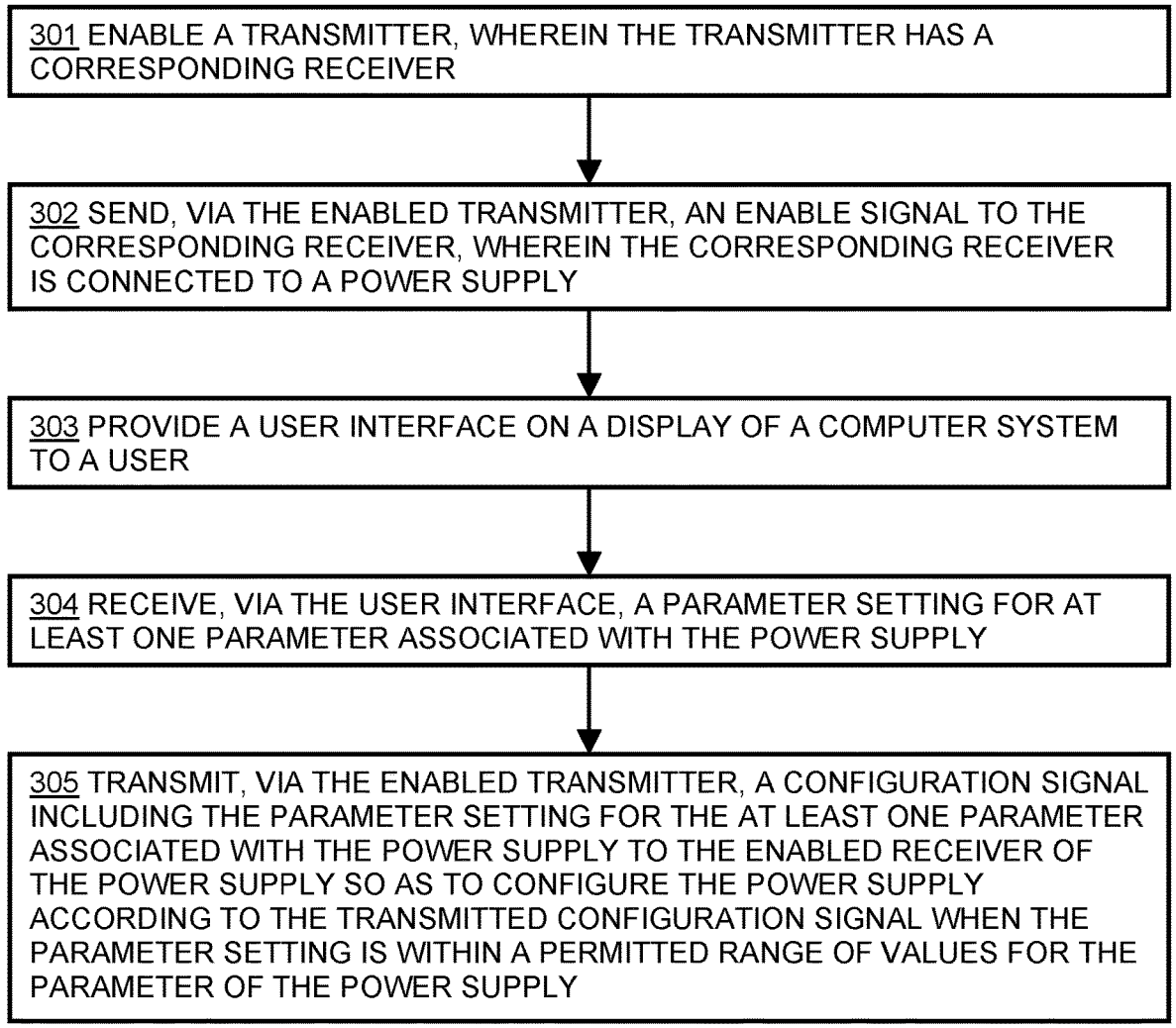

FIG. 1 is a block diagram illustrating example architecture of a system 100 that includes a first computer system 110 and a second computer system 120. The first computer system 100 executes, runs, interprets, operates or otherwise performs a configuration setting application 140-1 and a configuration setting process 140-2 suitable for use in explaining example configurations disclosed herein. The second computer system 120 executes, runs, interprets, operates or otherwise performs a configuring application 150-1 and a configuring process 150-2 also suitable for use in explaining example configurations disclosed herein.

The first computer system 110 may be any type of computerized device such as a personal computer, workstation, portable computing device, console, laptop, network terminal or the like. As shown in FIG. 1, the first computer system 110 includes a first interconnection mechanism 111 such as a data bus or other circuitry that couples a first memory system 112 (also referred to herein as a memory 112), a first processor 113, a display 114, and a transmitter 119. An optional input device (e.g., one or more user/developer controlled devices such as a keyboard, mouse, touchpad, trackball, etc.) (not shown) may couple to the first computer system 110 allowing a user to provide input to the first computer system 110. Alternatively, or additionally, the optional input device may be realized through use of a touchscreen and/or other touch sensitive device via the display 114. The display 114 includes a user interface. The transmitter 119 allows the first computer system to communicate with an associated receiver 129 of the second computer system 120 and thereby with the power supply 150.

The first memory system 112 is any type of computer readable medium and in some embodiments is encoded with a configuration setting application 140-1 that includes a configuration setting process 140-2. The configuration setting application 140-1 may be embodied as software code such as data and/or logic instructions (e.g., code stored in the first memory system 112 or on another computer readable medium such as a removable disk) that supports processing functionality according to different embodiments described herein. During operation of the first computer system 110, the first processor 113 accesses the first memory system 112 via the interconnection mechanism 111 in order to launch, run, execute, interpret or otherwise perform the logic instructions of the configuration setting application 140-1. Execution of the configuration setting application 140-1 in this manner produces processing functionality in a configuration setting process 140-2. In other words, the configuration setting process 140-2 represents one or more portions or runtime instances of the configuration setting application 140-1 performing or executing within or upon the first processor 113 in the first computer system 110 at runtime.

It is noted that example configurations disclosed herein include the configuration setting application 140-1 itself including the configuration setting process 140-2 (i.e., in the form of un-executed or non-performing logic instructions and/or data). The configuration setting application 140-1 may be stored on a computer readable medium (such as a floppy disk), hard disk, electronic, magnetic, optical or other computer readable medium. The configuration setting application 140-1 may also be stored in the first memory system 112 such as in firmware, read only memory (ROM), or, as in this example, as executable code in, for example, Random Access Memory (RAM). In addition to these embodiments, it should also be noted that other embodiments herein include the execution of the configuration setting application 140-1 in the first processor 113 as the configuration setting process 140-2. Those skilled in the art will understand that the first computer system 110 may include other processes and/or software and hardware components, such as an operating system not shown in this example.

The second computer system 110 may be any type of computerized device such as a processor, microprocessor, controller, microcontroller, or the like. As shown in FIG. 1, the second computer system 120 includes a second interconnection mechanism 121 such as a data bus or other circuitry that couples a second memory system 122 (also referred to herein as a second memory 122), a second processor 123, and a receiver 129 associated with the transmitter 119. The second computer system 120 is part of a power supply 150, as described in greater detail below.

The second memory system 122 is any type of computer readable medium and in some embodiments is encoded with a configuring application 150-1 that includes a configuring process 150-2. The configuring application 150-1 may be embodied as software code such as data and/or logic instructions (e.g., code stored in the second memory system 122 or on another computer readable medium such as a removable disk) that supports processing functionality according to different embodiments described herein. During operation of the second computer system 120, the second processor 123 accesses the second memory system 122 via the second interconnection mechanism 121 in order to launch, run, execute, interpret or otherwise perform the logic instructions of the configuring application 150-1. Execution of the configuring application 150-1 in this manner produces processing functionality in a configuring process 150-2. In other words, the configuring process 150-2 represents one or more portions or runtime instances of the configuring application 150-1 performing or executing within or upon the second processor 123 in the second computer system 120 at runtime.

It is noted that example configurations disclosed herein include the configuring application 150-1 itself including the configuring process 150-2 (i.e., in the form of un-executed or non-performing logic instructions and/or data). The configuring application 150-1 may be stored on a computer readable medium (such as a floppy disk), hard disk, electronic, magnetic, optical or other computer readable medium. The configuring application 150-1 may also be stored in the second memory system 122 such as in firmware, read only memory (ROM), or, as in this example, as executable code in, for example, Random Access Memory (RAM). In addition to these embodiments, it should also be noted that other embodiments herein include the execution of the configuring application 150-1 in the second processor 123 as the configuring process 150-2. Those skilled in the art will understand that the second computer system 120 may include other processes and/or software and hardware components, such as an operating system not shown in this example.

FIG. 1 shows the second computer system 120 as being part of a power supply 150, though in some embodiments, the second computer system 120 may be external to the power supply 150 while remaining communication with the power supply 150. Further, in some embodiments, the system 100 may optionally include at least one gateway 200, wherein the at least one gateway 200 facilitates communication between a plurality of the first computer system 110 and/or a plurality of the transmitter 119 and the power supply 150 and/or the second computer system 120 and/or a plurality of the power supply 150 and/or a plurality of the second computer system 120. In some embodiments, the optional at least one gateway 200 may be a plurality of optional gateways. Further, in some embodiments, the at least one optional gateway may be a gateway that facilitates communication between the system 100 and a building management system and/or a light management system. For example, the at least one optional gateway may be but is not limited to a CAN2GO gateway. For example, the building management system may be but is not limited to BACNet®. For example, the light management system may be but is not limited to the Encelium system sold by OSRAM SYLVANIA Inc. of Danvers, Mass. In embodiments including the at least one optional gateway 200, the transmitter 119 may communicate with the receiver 129 through the at least one optional gateway 200, and the at least one optional gateway 200 passes configuration signals, commands, and the like to the power supply 150 (i.e., controls the power supply 150). Alternatively and/or additionally, the transmitter 119 and the at least one optional gateway 200 may both control the power supply 150. For example, the at least one optional gateway may monitor the transmitter 119 and rebroadcast commands to the power supply 150 as needed. In some embodiments including the at least one optional gateway 200, when power to the system 100 and/or the at least one optional gateway 200 is interrupted and/or first provided, in order to synchronize the at least one optional gateway 200 and the system 100, the power supply 150 will be forced on with a particular parameter setting at a particular value, as the at least one optional gateway 200 in unable to query the power supply 150 to determine its current status and/or current parameter settings.

The power supply 150 may be any known type of power supply, but in some embodiments, is a lighting power supply (i.e., a power supply designed to provide power to a light source, such as but not limited to a solid state light source). The term "solid state light source" includes one or more light emitting diodes (LEDs), organic light emitting diodes (OLEDs), polymer light emitting diodes (PLEDs), and/or combinations thereof.

In some embodiments, the receiver 129 is a TCM-300C radio receiver from EnOcean of Oberhaching, Germany, though of course other receivers may be used without departing from the scope of the invention.

A number of flowcharts of the presently disclosed methods are illustrated in FIGS. 2-4. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order. More specifically, FIGS.

2-4 illustrate various flowcharts of procedures performed by the system 100 of FIG. 1 when remotely configuring a power supply.

FIG. 3 shows the configuration setting application 140-1 executed as the configuration setting process 140-2. The configuration setting process 140-2 first enables a transmitter (such as the transmitter 119 of the first computer system 110), step 301, wherein the transmitter has a corresponding receiver (i.e., the receiver 129 of the second computer system 120/the power supply 150). The CS process 140-2 then sends, via the enabled transmitter 119, an enable signal to the corresponding receiver 129, step 302. The CS process 140-2 then provides a user interface on the display 114 of the first computer system 110 to a user (not shown in FIG. 1), step 303. The user interface provided by the CS process 140-2 may be of any design so long as it communicates information regarding possible power supply parameters and their setting(s) to the user via the display 114 and/or any associated components (e.g., one or more speakers). The CS process 140-2 then receives, via the user interface, a parameter setting for at least one parameter associated with the power supply 150, step 304. A parameter may be any input and/or output value of the power supply 150 that is capable of being changed without having to physically add and/or remove one or more components from the power supply 150. In some embodiments, the parameter may be a power up intensity, an overall minimum and a maximum output intensity, an end user minimum and maximum intensity (as a function of the overall minimum and maximum intensity), a fade up rate, a fade down rate, a dimming response, an output current for the power supply, and/or a pulse width modulation for the power supply, among others.

The CS process 140-2 then transmits, via the enabled transmitter 119, a configuration signal including the parameter setting for the at least one parameter associated with the power supply 150 to the enabled receiver 129 of the power supply 150 so as to configure the power supply 150 according to the transmitted configuration signal when the parameter setting is within a permitted range of values for the parameter of the power supply 150, step 305.

In some embodiments, the CS process 140-2 further displays, via the user interface, a setting error message to the user, wherein the setting error message indicates to the user that the user has selected a parameter setting for the at least one parameter that is outside the permitted range of values for the at least one parameter. The error message may take any form allowed by the display 114 (e.g., text message displayed, audible sound played, etc.) and/or the first computer system 110. Further, in some embodiments, the CS process 140-2 also prompts the user to enter a further parameter setting for the at least one parameter, and receives, via the user interface from the user, a further parameter setting for the at least one parameter. Thus, if a user provides a parameter setting that is outside the permissible settings allowed by the power supply 150 (more particularly, the CON process 150-2 as described below), the CS process 140-2 will let the user know this and will prompt the user to provide an acceptable value (e.g., the CS process 140-2 may show the user the range of acceptable values for that parameter).

In some embodiments, the CS process 140-2 may receive, via the user interface, a parameter setting for at least one parameter associated with the power supply, and prior to transmitting, may receive a configuring user identifier associated with the parameter setting, the configuring user identifier identifying the user to the power supply 150. The CS process 140-2, when transmitting via the enabled transmitter 119, would thus transmit a configuration signal including the parameter setting to the enabled receiver 129 of the power supply 150 so as to configure the power supply 150 according to the transmitted configuration signal when the configuring user identifier associated with the parameter setting permits configuration of the power supply 150 by the user identified by the configuring user identifier. Thus, in some embodiments, the CS process 140-2 allows only certain users identified to the CS process 140-2/the first computer system 110 in particular ways (e.g., via password protection, license key, and/or any other known process) to configure certain parameters of the power supply 150. In some embodiments, the CS process 140-2 may further display, via the user interface, an error message to the user, wherein the error message indicates to the user that the user is not permitted to configure the at least one parameter associated with the power supply 150.

As shown in FIG. 2, the configuring application 150-1, when executing as the configuring process 150-2, first enables a receiver (i.e., the receiver 129) connected to a power supply (i.e., the power supply 150), step 201. As shown in FIG. 1, the receiver 129 is connected to the second memory system 122 of the second computer system 120. The second memory system 122 includes at least one parameter value for a parameter associated with the power supply 150. Parameters associated with the power supply 150 may be, but are not limited to, any input and/or output and/or combinations thereof of the power supply 150 that may be changed without changing the components of the power supply 150. The configuring process 150-2 then receives a configuration signal via the enabled receiver 129, wherein the configuration signal includes a parameter setting for a parameter associated with the power supply 150, step 202. A parameter setting is a particular value for a given parameter. For example, a parameter setting may be an intensity level of light output by a light source connected to the power supply 150 upon startup of the power supply 150, such as but not limited to 100% light output. Any possible setting of any of the parameters described above with regards to the configuration setting process 140-2 may be used. The configuring process 150-2 then decodes the configuration signal within the power supply 150, step 203. Finally, the configuring process 150-2 configures the power supply 150 based on the decoded configuration signal and the parameter setting when the parameter setting matches the at least one parameter value, step 204. That is, so long as the parameter setting taken from the decoded configuration signal matches a value for the parameter that is stored within the second memory system 122, the configuring process 150-2 will alter the configuration of the power supply 150 to produce that parameter setting. A parameter setting that does not match any value for that parameter that is stored within the second memory system 122 will cause no change to the power supply 150 via the configuring process 150-2. Thus, using the example parameter above, the values stored within the second memory system 122 for the intensity level of light output by a light source connected to the power supply 150 upon startup may range from 0.01% to 100% in any increment. A parameter setting from the configuration signal that is 150% intensity level of light output will not result in any change to the power supply 150 by the configuring process 150-2.

In some embodiments, the second memory system 122 may include at least one parameter value for a parameter associated with the power supply and a corresponding user identifier that restricts setting the parameter to a first set of users associated with the user identifier. The configuring process 150-2 then may receive a configuration signal via the enabled receiver 129 that includes a parameter setting for a parameter associated with the power supply 150 and a configuring user identifier for the parameter setting. The configuring process 150-2, when decoding, may then decode the configuration signal within the power supply 150 to determine the parameter, its associated parameter setting, and the configuring user identifier for the associated parameter setting, and may match the configuring user identifier from the decoded configuration signal with the user identifier of the parameter. The configuring process 150-2 will then permit configuring of the power supply 150 when the configuring user identifier matches the user identifier of the parameter, and in response, will configure the power supply 150 based on the parameter setting from the decoded configuration signal. The configuring process 150-2 will prevent configuring of the power supply 150 when the configuring user identifier does not match the user identifier of the parameter. This functionality allows certain parameters to be changed only by certain users. For example, in the case of a lighting power supply, it may be advantageous (e.g., for safety reasons) to limit the parameters that an end user may change. Alternatively, and/or additionally, it may advantageous for a distributor of the lighting power supply to be able to change parameters that are associated with the type of fixture and/or light source the lighting power supply is used in conjunction with.

In some embodiments, the second memory system 150-2, to which the receiver 129 enabled by the CON process 150-2 is connected, includes a plurality of parameters associated with the power supply 150, wherein at least one parameter in the plurality of parameters includes a range of values for the at least one parameter. The CON process 150-2 then receives a configuration signal via the enabled receiver 129, wherein the configuration signal includes a parameter setting for the at least one parameter. The CON process 150-2 then decodes the configuration signal within the power supply 150 to determine the at least one parameter and its associated parameter setting, and compares the decoded parameter setting with the range of values for the at least one parameter to produce a comparison result. The CON process 150-2 then configures the power supply 150 so that the parameter is set to the decoded parameter setting when the comparison result indicates that the decoded parameter setting is within the range of values for the at least one parameter, and fails to configure the power supply 150 when the comparison result indicates that the decoded parameter setting is outside of the range of values for the at least one parameter.

In some embodiments, the second memory system 122, which is connected to the receiver 129 that is enabled by the CON process 150-2, includes at least one parameter value for a parameter associated with the power supply and a set of activation commands, wherein each activation command in the set of activation commands corresponds to a configuration for the power supply associated with a startup signal. An activation command may be, but is not limited to, a turn on/turn off/start dim cycle/stop dim cycle command. A startup signal is a signal (i.e., command) that tells the power supply 150 to activate, de-activate, and/or dim. The CON process 150-2 then receives a first startup signal via the enabled receiver 129, wherein the first startup signal corresponds to a first activation command in the set of activation commands. The CON process 150-2 decodes the first startup signal within the power supply 150. The CON process 150-2 configures the power supply 150 according to the configuration corresponding to the first activation command. In other words, an activate signal may cause the CON process 150-2 to configure the power supply 150 so that it starts up.

Of course, more than one activation signal may be sent, and the order in which they are sent may be important. Thus, in some embodiments, the CON process 150-2 receives a further startup signal (e.g., deactivate) via the enabled receiver 129, wherein the further startup signal corresponds to a further activation command (e.g., turn off) in the set of activation commands. The CON process 150-2 then configures the power supply 150 according to the configuration corresponding to the further activation command.

In some embodiments, such as is shown in FIG. 4, when acting in concert (i.e., the configuring process 150-2 takes actions based on actions taken by the configuration setting process 140-2 and/or the configuration setting process 140-2 takes actions based on actions taken by the configuring process 150-2), the configuration setting process 140-2 and the configuring process 150-2 together may perform the following operations: enabling the transmitter 119, step 401; sending, via the enabled transmitter 119, an enable signal to the corresponding receiver 129, step 402; in response, enabling the receiver 129, wherein the receiver 129 is connected to the second memory system 122, wherein the second memory system 122 includes at least one parameter value for a parameter associated with the power supply 150, step 403; providing a user interface on the display 114 of the first computer system 110 to a user, step 404; receiving, via the user interface, a parameter setting for a parameter associated with the power supply 150, step 405; transmitting, via the enabled transmitter 119, a configuration signal including the parameter setting for the parameter associated with the power supply 150 to the enabled receiver 129 of the power supply 150, step 406; receiving the configuration signal via the enabled receiver 129, step 407; decoding the configuration signal within the power supply 150, step 408; and configuring the power supply 150 based on the decoded configuration signal and the parameter setting when the parameter setting matches the at least one parameter value, step 409. In such embodiments, the configuration setting process 140-2 performs the following operations: enabling the transmitter 119; sending, via the enabled transmitter 119, an enable signal to the corresponding receiver 129; providing a user interface on the display 114 of the first computer system 110 to a user; receiving, via the user interface, a parameter setting for a parameter associated with the power supply 150; and transmitting, via the enabled transmitter 119, a configuration signal including the parameter setting for the parameter associated with the power supply 150 to the enabled receiver 129 of the power supply 150. The configuring process 150-2 performs the remaining operations.

In some embodiments, when acting in concert, the configuring process 150-2, when enabling the receiver 129, in response, enables the receiver 129, wherein the receiver 129 is connected to the second memory system 122, wherein the second memory system 122 includes a range of parameter values for a parameter associated with the power supply 150. Further, the configuring process 150-2, when decoding, decodes the configuration signal within the power supply 150 to determine the parameter and its associated parameter setting, and compares the decoded parameter setting with the range of values for the parameter to produce a comparison result. The configuring process 150-2 further, when configuring, configures the power supply 150 so that the parameter is set to the decoded parameter setting when the comparison result indicates that the decoded parameter setting is within the range of values for the at least one parameter, and fails to configure the power supply 150 when the comparison result indicates that the decoded parameter setting is outside of the range of values for the at least one parameter.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

Thus, the subject matter may be embodied as a device, system, method and/or computer product. Accordingly, some or all of the subject matter may be embodied in hardware and/or in software (including firmware, resident software, micro-code, state machines, gate arrays, etc.).

In some embodiments, a computer product on a computer-readable medium that is non-transitory is disclosed. The computer readable medium has instructions tangibly stored thereon, which are executable by a processor. Such embodiments may include instructions directly executable by the processor without any conversion to program instructions, and/or may include instructions which must be converted prior to being executable on the processor. Conversion may be, but is not limited to, interpreting, compiling, and linking.

A computer-readable medium may be any medium that can contain, store communicate, propagate, or transport (program) instructions for use by, on, and/or in connection with, the processor. The computer-readable medium may be, for example but not limited to, an electronic, magnetic, optical electromagnetic, infrared, or semiconductor system, apparatus, device or propagation medium. By way of example and not limitation, a computer-readable medium may comprise a computer-storage medium. A computer-storage medium includes volatile and nonvolatile, removable and non-removable medium implemented in any method or technology suitable for storing processor accessible information such as program instructions, data structures, databases or other data. Computer-storage medium includes, but is not limited to, memory as defined herein, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a processor.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method, comprising:
    enabling a receiver connected to a power supply, wherein the receiver is connected to a memory system, wherein the memory system includes at least one parameter value for a parameter associated with the power supply;
    receiving a configuration signal via the enabled receiver, wherein the configuration signal includes a parameter setting for the parameter associated with the power supply;
    decoding the configuration signal within the power supply; and
    configuring the power supply based on the decoded configuration signal and the parameter setting when the parameter setting matches the at least one parameter value.

2. The method of claim 1, wherein enabling comprises:
    enabling the receiver connected to the power supply, wherein the receiver is connected to the memory system, wherein the memory system includes at least one parameter value for the parameter associated with the power supply and a corresponding user identifier that restricts setting the parameter to a first set of users associated with the user identifier;
    and wherein receiving comprises:
    receiving the configuration signal via the enabled receiver, wherein the configuration signal includes the parameter setting for the parameter associated with the power supply and a configuring user identifier for the parameter setting;
    and wherein decoding comprises:
    decoding the configuration signal within the power supply to determine the parameter, its associated parameter setting, and the configuring user identifier for the associated parameter setting;
    matching the configuring user identifier from the decoded configuration signal with the user identifier of the parameter;
    and wherein configuring comprises:
    permitting configuring of the power supply when the configuring user identifier matches the user identifier of the parameter, and in response, configuring the power supply based on the parameter setting from the decoded configuration signal; and
    preventing configuring of the power supply when the configuring user identifier does not match the user identifier of the parameter.

3. The method of claim 1, wherein enabling comprises:
    enabling the receiver connected to the power supply, wherein the receiver is connected to the memory system, wherein the memory system includes a plurality of parameters associated with the power supply, wherein at least one parameter in the plurality of parameters includes a range of values for the at least one parameter.

4. The method of claim 3, wherein receiving comprises:
    receiving the configuration signal via the enabled receiver, wherein the configuration signal includes a parameter setting for the at least one parameter;
    and wherein decoding comprises:
    decoding the configuration signal within the power supply to determine the at least one parameter and its associated parameter setting;
    comparing the decoded parameter setting with the range of values for the at least one parameter to produce a comparison result;
    and wherein configuring comprises:
    configuring the power supply so that the parameter is set to the decoded parameter setting when the comparison result indicates that the decoded parameter setting is within the range of values for the at least one parameter; and
    failing to configure the power supply when the comparison result indicates that the decoded parameter setting is outside of the range of values for the at least one parameter.

5. The method of claim 1 wherein enabling comprises:
    enabling the receiver connected to the power supply, wherein the receiver is connected to the memory system, wherein the memory system includes at least one parameter value for the parameter associated with the power supply and a set of activation commands, wherein each activation command in the set of activation commands corresponds to a configuration for the power supply associated with a startup signal;
    and wherein receiving comprises:
    receiving a first startup signal via the enabled receiver, wherein the first startup signal corresponds to a first activation command in the set of activation commands;
    and wherein decoding comprises:
    decoding the first startup signal within the power supply;
    and wherein configuring comprises:
    configuring the power supply according to the configuration corresponding to the first activation command.

6. The method of claim 5, further comprising:
    receiving a further startup signal via the enabled receiver, wherein the further startup signal corresponds to a further activation command in the set of activation commands; and
    configuring the power supply according to the configuration corresponding to the further activation command.

7. A computer program product, stored on a non-transitory computer readable medium, including instructions that, when executed on a processor in communication with a power supply, cause the processor to perform operations of:
    enabling a receiver connected to the power supply, wherein the receiver is connected to a memory system, wherein the memory system includes at least one parameter value for a parameter associated with the power supply;

receiving a configuration signal via the enabled receiver, wherein the configuration signal includes a parameter setting for a parameter associated with the power supply;

decoding the configuration signal within the power supply; and configuring the power supply based on the decoded configuration signal and the parameter setting when the parameter setting matches the at least one parameter value.

8. The computer program product of claim 7, wherein the processor performs operations of enabling by:

enabling the receiver connected to the power supply, wherein the receiver is connected to the memory system, wherein the memory system includes at least one parameter value for the parameter associated with the power supply and a corresponding user identifier that restricts setting the parameter to a first set of users associated with the user identifier;

and wherein the processor performs operations of receiving by:

receiving the configuration signal via the enabled receiver, wherein the configuration signal includes the parameter setting for the parameter associated with the power supply and a configuring user identifier for the parameter setting;

and wherein the processor performs operations of decoding by:

decoding the configuration signal within the power supply to determine the parameter, its associated parameter setting, and the configuring user identifier for the associated parameter setting;

matching the configuring user identifier from the decoded configuration signal with the user identifier of the parameter;

and wherein the processor performs operations of configuring by:

permitting configuring of the power supply when the configuring user identifier matches the user identifier of the parameter, and in response, configuring the power supply based on the parameter setting from the decoded configuration signal; and preventing configuring of the power supply when the configuring user identifier does not match the user identifier of the parameter.

9. The computer program product of claim 7, wherein the processor performs operations of enabling by:

enabling the receiver connected to the power supply, wherein the receiver is connected to the memory system, wherein the memory system includes at least one parameter value for the parameter associated with the power supply and a set of activation commands, wherein each activation command in the set of activation commands corresponds to a configuration for the power supply associated with a startup signal;

and wherein the processor performs operations of receiving by:

receiving a first startup signal via the enabled receiver, wherein the first startup signal corresponds to a first activation command in the set of activation commands;

and wherein the processor performs operations of decoding by:

decoding the first startup signal within the power supply; and wherein the processor performs operations of configuring by:

configuring the power supply according to the configuration corresponding to the first activation command.

10. The computer program product of claim 9, wherein the processor performs further operations of:

receiving a further startup signal via the enabled receiver, wherein the further startup signal corresponds to a further activation command in the set of activation commands; and configuring the power supply according to the configuration corresponding to the further activation command.

11. The computer program product of claim 7, wherein the processor performs operations of enabling by:

enabling the receiver connected to the power supply, wherein the receiver is connected to the memory system, wherein the memory system includes a plurality of parameters associated with the power supply, wherein at least one parameter in the plurality of parameters includes a range of values for the at least one parameter.

12. The computer program product of claim 11, wherein the processor performs operations of receiving by:

receiving the configuration signal via the enabled receiver, wherein the configuration signal includes the parameter setting for the at least one parameter;

and wherein the processor performs operations of decoding by:

decoding the configuration signal within the power supply to determine the at least one parameter and its associated parameter setting; and comparing the decoded parameter setting with the range of values for the at least one parameter to produce a comparison result;

and wherein the processor performs operations of configuring by:

configuring the power supply so that the parameter is set to the decoded parameter setting when the comparison result indicates that the decoded parameter setting is within the range of values for the at least one parameter; and failing to configure the power supply when the comparison result indicates that the decoded parameter setting is outside of the range of values for the at least one parameter.

* * * * *